Nov. 10, 1931.    L. S. HARBER    1,831,531
SCRAPER FOR ROLLERS
Filed June 1, 1927    3 Sheets-Sheet 1
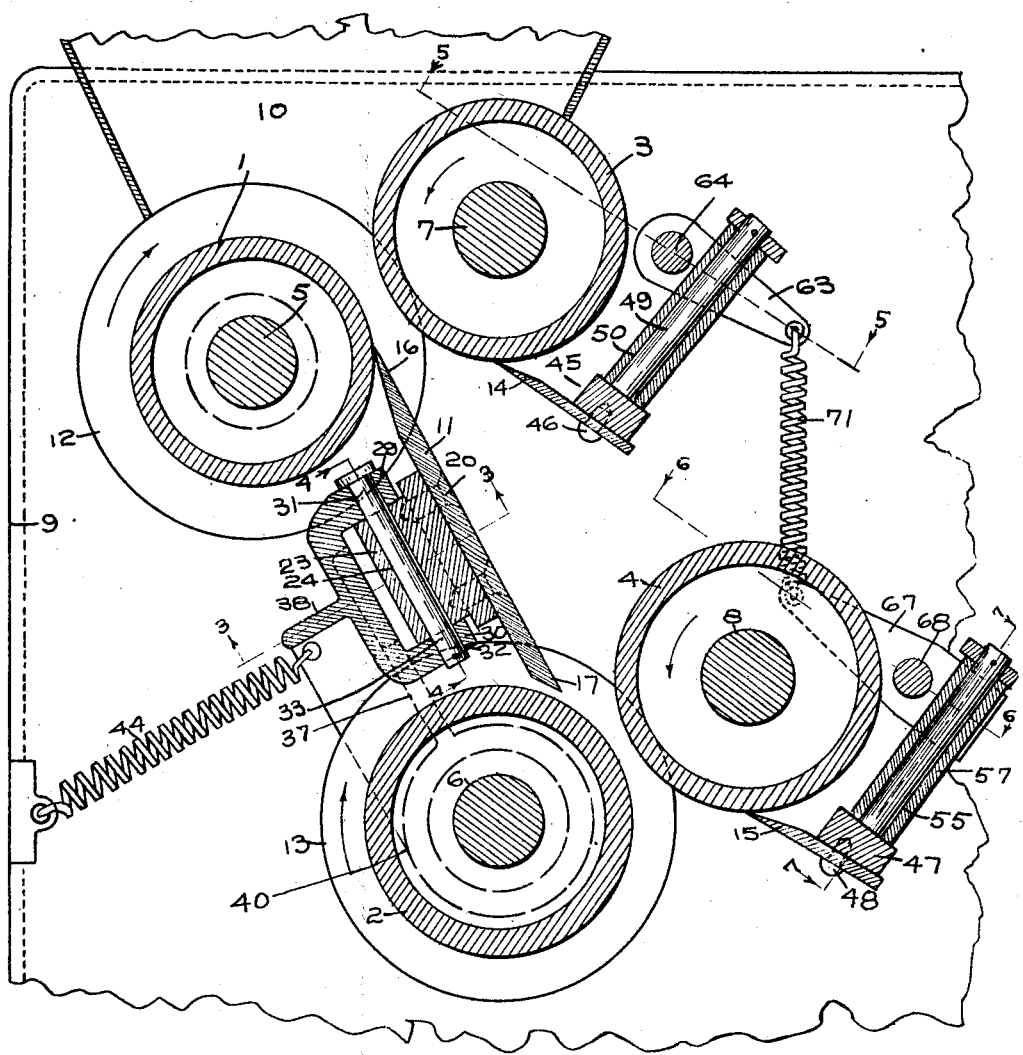
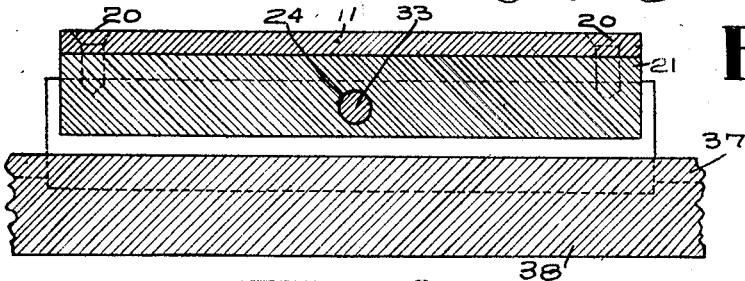
FIG. 1
FIG. 3
INVENTOR
LAURENCE S. HARBER
BY Newell & Spencer
ATTORNEYS Nov. 10, 1931. L. S. HARBER 1,831,531
SCRAPER FOR ROLLERS
Filed June 1, 1927 3 Sheets-Sheet 2

INVENTOR
LAURENCE S. HARBER
BY
Newell & Spencer
ATTORNEYS

Nov. 10, 1931.   L. S. HARBER   1,831,531
SCRAPER FOR ROLLERS
Filed June 1, 1927   3 Sheets-Sheet 3

INVENTOR
LAURENCE S. HARBER
BY Newell + Spencer
ATTORNEYS

Patented Nov. 10, 1931

1,831,531

UNITED STATES PATENT OFFICE

LAURENCE SEYMOUR HARBER, OF PETERBOROUGH, ENGLAND, ASSIGNOR TO BAKER PERKINS COMPANY, INCORPORATED, OF SAGINAW, MICHIGAN, A CORPORATION OF NEW YORK

SCRAPER FOR ROLLERS

Application filed June 1, 1927. Serial No. 195,743.

This invention relates to new and useful improvements in machines in which plastic or other material is operated upon by rollers, and more particularly to a novel and improved means for maintaining the surfaces of the rollers free of the material which is operated upon.

In the present application, the invention is shown as applied to dough sheeting rolls of a dough rolling machine for rolling out pieces of dough into a sheet. It is to be understood, however, that the invention is not necessarily limited to use in machines of this particular type, but that it may be embodied to advantage in other machines having rollers operating upon material which adheres to the peripheral surfaces of the rollers.

The invention contemplates the provision of a scraper arranged to engage the peripheral surfaces of a roller for operating upon plastic or other material and one of the objects of the invention is to mount the scraper in a novel and improved manner so that it will at all times conform, to the maximum degree, to the peripheral operating surface of the roller throughout the entire length of said surface.

With this and other objects in view, the invention consists in the novel and improved constructions, combinations and arrangement of parts hereinafter described and particularly pointed out in the claims, the advantages of which will be readily understood and appreciated by those skilled in the art.

The invention will be clearly understood from the accompanying drawings illustrating the invention in its preferred form and the following detailed description therein shown. In the drawings—

Figure 1 is a vertical sectional view of a dough sheeting mechanism of a type commonly employed in the baking art in connection with various types of dough treating machinery;

Figure 3 is a detail sectional view taken on the line 3—3 of Figure 1;

Figure 4:
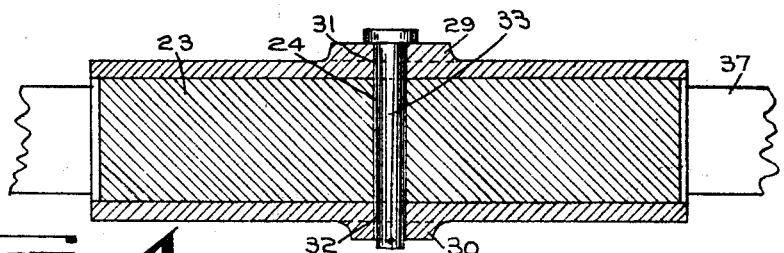
Figure 4 is a detail sectional view taken on the line 4—4 of Figure 1.

As hereinbefore stated, the invention is illustrated in this application as applied to a dough sheeting mechanism. In the construction shown, the dough sheeting mechanism comprises a hopper 10 for the reception of pieces of dough and a plurality of sheeting rollers 1, 3, 2 and 4. These rollers are arranged in pairs, the rollers 1 and 3 constituting the upper pair and the rollers 2 and 4 constituting the lower pair. The dough is passed from the hopper 10 between the rollers 1 and 3 and then downwardly between the rollers 2 and 4, the rollers of each pair co-operating to roll the dough out into a relatively thin sheet. The roller 1 of the upper pair of rollers is provided with end flanges 12 between which the roller 3 engages. These flanges prevent the dough from overlapping the ends of the rollers. The roller 2 of the lower pair is provided with similar end flanges 13 between which the roller 4 engages.

As will be noted from an inspection of Figure 1, the rollers 2 and 4 are spaced from each other a distance somewhat less than the space between the rollers 1 and 3 so that the sheet of dough passing from between the rollers 1 and 3 to the rollers 2 and 4 will be rolled out into a thinner sheet by the latter pair of rollers. The rollers 1, 3, 2 and 4 are respectively fixed to shafts 5, 7, 6 and 8 mounted in suitable bearings on the frame 9 of the machine and the rollers are driven in the direction of the arrows, Figure 1, by suitable driving mechanism, not shown.

As portions of the material being sheeted frequently adhere to the rollers and form more or less extended films thereon, scrapers are provided for cleaning the surfaces of the rollers.

To enable each of the scrapers to conform to the maximum degree to the peripheral operating surface of the corresponding roller throughout the entire length of this surface, each scraper is mounted so that it can move bodily toward and from the axis of the roller. It is also supported so that its ends are enabled to move independently toward and from the axis of the roller. This independent movement of the ends of the scraper is secured by mounting the scraper to turn upon an axis lying in a plane intersecting the axis of the roller and preferably substantially perpendicular to this axis.

Arranged between the rollers 1 and 2, there is an elongated plate 11, and this plate 11 has oppositely disposed side projections 16 and 17 which in operation occupy positions between the end flanges of the rollers 1 and 2 respectively. The projection 16 has a beveled edge which as shown in Figure 1 is adapted normally to engage the peripheral surface of the roller 1 and said projection constitutes a scraper for the roller.

In the present form of the invention the plate 11 together with its projections 16 and 17 constitutes a bridge between the rollers 1 and 2 and serves to transfer the sheeted material from the rollers 1 and 3 to the rollers 2 and 4 during the sheeting operation.

Figure 2:
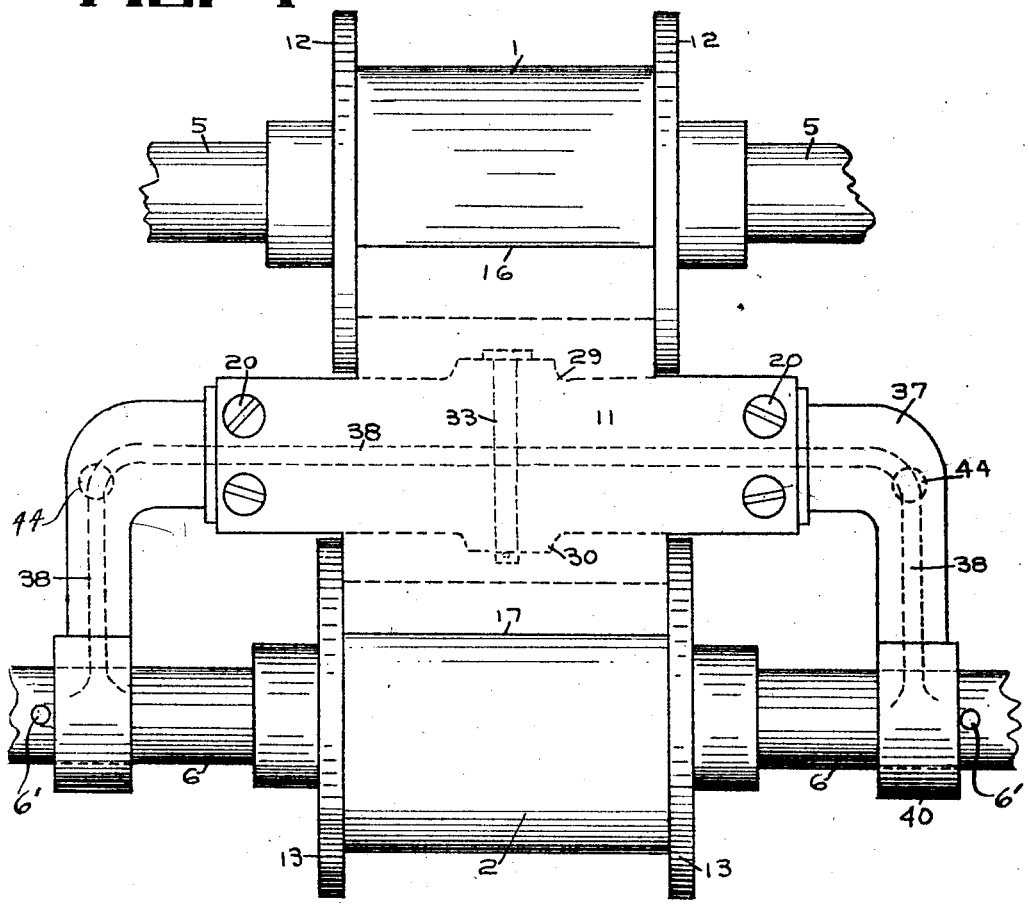
Figure 2 is a plan view of a portion of the dough sheeting mechanism.
Figure 7:
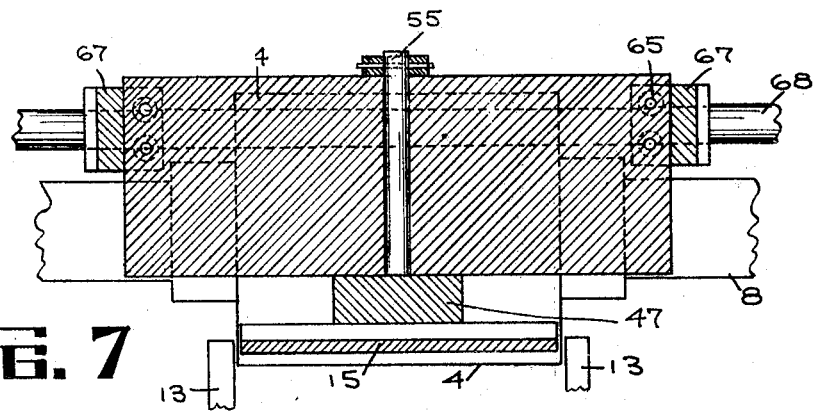
Figure 7 is a detail sectional view taken on the line 7—7 of Figure 1.
Figure 6:
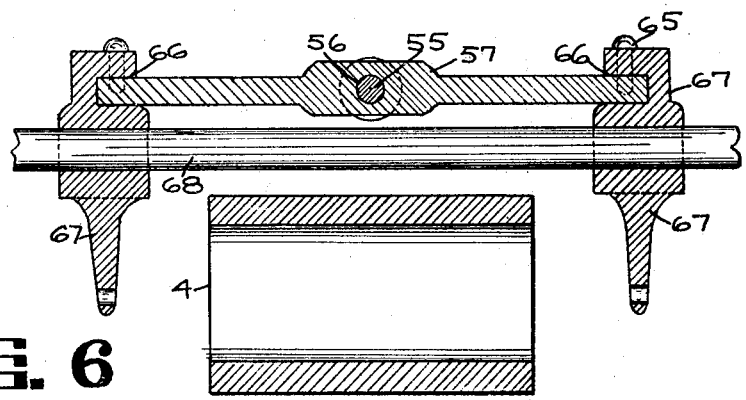
Figure 6 is a detail sectional view taken on the line 6—6 of Figure 1.
Figure 5:
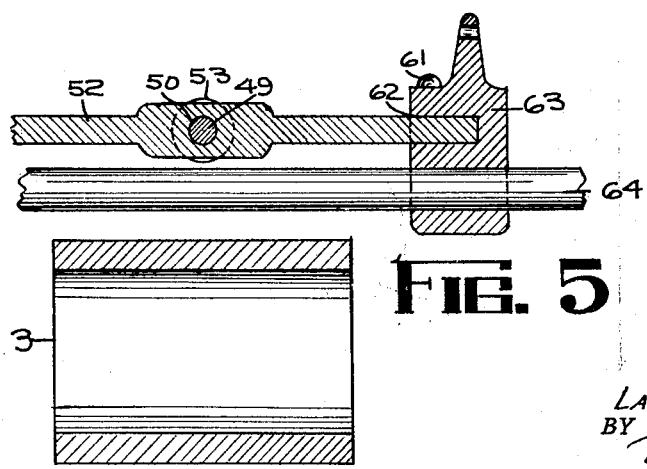
Figure 5 is a detail sectional view taken on the line 5—5 of Figure 1.

The plate 11 is adapted to have a swinging or pivotal movement toward and from the roller 1 with which the scraper 16 engages, and in the present embodiment of the invention, this movement is provided for by means of a pivotally mounted support for the plate 11. This pivotally mounted support comprises a yoke member 37, the arms 38 of which carry bearings 40. This yoke member is pivotally mounted on the shaft 6 of the roller 2 so that said member can swing about the axis of the roller 2. The yoke member 37 is maintained against longitudinal movement of the shaft 6 by means of suitable stops, herein shown as comprising two pins 6', see Figure 2. Thus the arc of pivotal movement of the yoke member 37 is concentric with the arc of rotation of the roller 2. By this arrangement of parts, the scraper 16 is permitted to move toward and away from the roller 1 while the projection 17 of the plate 11 is maintained at a substantially uniform distance from the periphery of the roller 2 during the movements of the scraper.

To maintain the scraper 16 at all times in engagement with the roller 2, suitable means such as a spring 44 may be employed, said spring being attached at one of its ends to the frame 9 of the machine, and at its other end to the yoke member 37. In the present illustration, two such springs are shown, there being one spring arranged near each end of the yoke member 37.

To insure a maximum extent of contact of the scraper 16 at all times with the peripheral surface of the roller 1 throughout its entire length, the plate 11 of which the scraper 16 is a part, is pivotally mounted to swing about an axis lying in a plane preferably substantially at right angles to the axis of the shaft 6. This provision for swinging movement of the plate 11 together with the provision for swinging movement of the yoke member 37, provides for an angular adjustment of the plate 11 and its associated scraper 16 in two intersecting planes.

In the present embodiment of the invention, the plate 11 is mounted on an elongated support 21 and is secured thereto by screws or other suitable fastening means 20. This elongated support 21 has a reduced portion 23 engaging between two spaced projections 29 and 30 formed on the yoke member 37.

The support 21 is pivotally mounted on the yoke 37 by means of a pin 33 passing through openings 31 and 32 in the projections 29 and 30 and through an opening 24 in the reduced portion 23 of support 21. The pin 33 is preferably arranged so that its axis lies in a plane substantially perpendicular to the axis of the roller 1.

From the foregoing it will be apparent that the scraper 16 is movable in a direction toward and away from the roller 1 by reason of the mounting of the yoke 37 to swing about the shaft 6. Furthermore the mounting of the scraper to swing about the pin 33 permits each end of the scraper to move toward and from the axis of the roller without affecting the distance of the other end of the scraper from said axis. That is, the devices for supporting the scraper permit the ends of the scraper to move independently toward and from the axis of the roller, so that the scraper will automatically conform to the surface of the roller substantially throughout the length of the roller.

Rollers 3 and 4 are each provided with a scraper, these scrapers being designated by the reference numerals 14 and 15 respectively. While these scrapers are mounted for movement in substantially the same manner as the scraper 16, the construction of the supporting devices is considerably different from the supporting devices for the latter scraper.

The scraper 14 is secured by screws or other fastening devices 46 to a block 45 which is attached to one end of a pin 49 forming a pivot for the block and scraper. The pin 49 is mounted to turn in a bearing in a transverse bar 52, having its ends engaging in slots 62 in arms 63 and secured to said arms by means of screws 61. The arms 63 are mounted to turn on a stationary shaft 64 suitably supported in the frame of the machine and stops 64$^a$ preferably in the form of pins, are employed to prevent movement of the arms 63 longitudinally of the shaft 64. The shaft 64 is preferably arranged with its axis substantially parallel to the axis of the roller 3 and each of the arms 63 is acted upon by a coiled spring 71 which tends to swing the said arms and thereby the scraper 14 in a direction to maintain the edge of the scraper in contact with the peripheral surface of the roller. The pin 49 is preferably arranged with its axis lying in a plane substantially perpendicular to the axis of the roller 3. This manner of mounting the scraper 14 enables the scraper as a whole to move toward and from the peripheral surface of the roller and also enables the opposite ends of the scraper to move independently toward and from the axis of the roller to conform to the surface of the roller.

The scraper 15 is mounted in substantially the same manner as the scraper 14. The scraper 15 is secured by screws 48 to block 47 mounted on the end of a pin 55. This pin is mounted to turn in a bearing in a transverse bar 57 secured at its ends in slots in the pivoted arms 67 by means of screws 65. The arms 67 are pivoted to swing on a stationary shaft 68 mounted in the frame of the machine and are maintained against sliding movement on said shaft by suitable stops such a spins or the like 68ª. The shaft 68 is preferably arranged with its axis substantially parallel to the axis of the roller 4 and the pin 55 is preferably arranged with its axis lying in a plane substantially perpendicular to the axis of the roller 4. The scraper 15 is yieldingly held in engagement with the peripheral surface of the roller 4 by means of the coiled springs 71 which are attached at their opposite ends to the arms 67 and to the arms 63.

With a scraper mounted in the manner in which the scrapers 16, 14 and 15 are mounted, the scraper will always conform to the surface of the roller and will have the proper contact with the roller throughout the maximum part of the operating edge of the scraper. If the surface of a roller becomes somewhat irregular or noncircular in cross-section through wear, or for any other reason, the scraper will conform generally with the irregularities both by reason of its being mounted for movement as a whole both toward and from the axis of the roller and also because of the independent movability of the ends of the scraper toward and from said axis. If the axis of the roller is displaced or if the surface thereof becomes eccentric to its axis, the scraper will conform in its position to the peripheral surface of the roller. This manner of mounting the scraper, therefore, greatly improves its efficiency as compared with prior constructions.

It is to be understood that the invention is not limited to the particular construction and arrangement of parts of the illustrated embodiment of the invention, but that the invention may be embodied in other forms within the scope of the claims.

Having explained the nature and object of the invention and having specifically described a mechanism embodying the invention in its preferred form, what is claimed is:

1. In a mechanism of the class described, a roller, a scraper for engaging the periphery of the roller, supporting devices for the scraper constructed and arranged to render each end of the scraper movable toward and from the axis of the roller without affecting the distance of the other end of the scraper from the axis of the roller, and means for yieldingly holding the scraper in contact with the roller.

2. In a mechanism of the class described, a roller, a scraper for engaging the periphery of the roller, devices for supporting the scraper for pivotal movement toward and from the axis of the roller, and devices for supporting the scraper for pivotal movement to carry the ends thereof independently toward and from the axis of the roller.

3. In a mechanism of the class described, a roller, a scraper for engaging the periphery of the roller, means for yieldingly pressing the scraper into engagement with the periphery of the roller, and means for pivotally supporting the scraper to swing about an axis lying in a plane substantially perpendicular to the axis of the roller.

4. In a mechanism of the class described, a roller, a scraper for engaging the periphery of the roller, means for pivotally supporting the scraper for movement about an axis lying in a plane substantially perpendicular to the axis of the roller, and means for pivotally supporting the scraper to swing about an axis substantially parallel to the axis of the roller.

5. In a mechanism of the class described, two rollers, a plate forming a bridge between said rollers, a scraper carried by said plate for engaging the periphery of one of said rollers, and means for mounting the plate for movement to carry the scraper toward and from the axis of the latter roller while the plate maintains a position out of contact with the periphery of the other roller.

6. In a mechanism of the class described, two rollers, a plate forming a bridge between said rollers, a scraper carried by said plate for engaging one of said rollers, and means for pivotally supporting the plate to swing about the axis of the other roller during the operation of the machine.

7. In a mechanism of the class described, two rollers, a plate forming a bridge between said rollers, a scraper carried by said plate for engaging the periphery of one of said rollers, and means for mounting said plate for movement to carry the scraper toward and from the axis of the first roller while the plate is maintained at a substantial distance from the other roller, and means for supporting the plate to permit the ends of the scraper to move independently toward and from the axis of the first roller.

8. In a mechanism of the class described, two rollers, a plate forming a bridge between said rollers, a scraper carried by said plate for engaging the periphery of one of said rollers, means for pivotally supporting the plate to swing about the axis of the other roller, and means for pivotally supporting the plate to swing about an axis lying in a plane substantially perpendicular to the axis of the first roller.

9. In a machine of the class described, a roller, a scraper for engaging the periphery of the roller, and supporting devices for said scraper constructed and arranged to render each end of the scraper movable toward and from the axis of the roller without affecting the distance of the other end of the scraper from the axis of the roller, whereby the scraper will engage properly with the periphery of the roller irrespective of changes incident to wear in either the roller's peripheral surface, the scraper, or both.

10. In a mechanism of the class described, a roller, a scraper for engaging the periphery of said roller, means for yieldingly pressing the scraper into engagement with the periphery of the roller, and supporting devices for the scraper, constructed and arranged so as to cause the scraper, while its edge remains in engagement with the roller, to turn automatically in accordance with the alterations in the contour of the working surface of the said roller and of the edge of the said scraper produced by wear.

11. In a machine for sheeting plastic substances, the combination with a roller, of a scraper for engaging the periphery of said roller, a support for said scraper, a pin mounted in said support upon which pin said scraper is pivoted, the pin being so arranged with relation to the scraper and the said support that the axis about which the pin turns lies in a plane substantially perpendicular to the edge of the scraper, means enabling the said support with the said scraper thereon to turn in an arc the axis of which is parallel to the axis of said roller, and resilient means connected to said support to maintain the edge of said scraper against the working surface of said roller.

12. In a machine for sheeting plastic materials, the combination with a roller, of a scraper for engaging the periphery of said roller, a transverse support, means for pivotally mounting the scraper on said support to swing about an axis located in a plane substantially perpendicular to the axis of said roller, a shaft, arms extending from said transverse support for pivotally mounting the same on said shaft in such a manner that the support with the scraper thereon moves in an arc, the axis of which is substantially parallel to the axis of the roller, resilient means arranged to maintain the scraper in engagement with the roller, and means constructed and arranged to keep the said arms in such position on the shaft as will prevent displacement of the scraper relative to the roller.

13. In a machine for sheeting plastic materials, the combination with two rollers mounted to rotate on substantially parallel axes, of a scraper plate serving as a bridge between the rollers and having a sharp edge engaging one of said rollers, a support for the scraper plate pivotally mounted on the shaft of the lower of said rollers, resilient means acting on said support for maintaining the sharp edge of the scraper plate against said first roller, and means provided in said support for enabling the scraper plate to turn freely about an axis lying in a plane substantially perpendicular to the axis of the first roller.

14. In a machine for sheeting plastic materials, the combination with two superimposed aligned flanged rollers serving as a support for the material to be sheeted, a scraper plate serving as a bridge between said rollers and having a sharp edge engaging the upper roller, projections on said plate extending at each side of said scraper beyond the flanges of said rollers, a bar extending along the underside of the scraper plate and rigidly fixed to the same, said bar having a reduced portion, a support having spaced flanges between which the reduced portion of said bar is adapted to be received, a pin passing through aligned openings in the flanges of said support and in the reduced portion of said bar, the axis of said pin lying in a plane substantially perpendicular to the sharp edge of the scraper plate, arms provided at each end of said support, bearings in the end of each of said arms, in which bearings the shaft of the lower of said rollers engages, resilient means connected to said support for causing engagement of the sharp edge of the scraper plate with the upper of said rollers and means maintaining said arms in a predetermined position on the shaft of said lower roller.

15. In a machine for sheeting plastic materials, the combination of a pair of superimposed rollers for compressing the material to be sheeted against a suitable support, a scraper mechanism for one of said rollers comprising a scraper engaging the working surface of the roller, a support for the scraper, a shaft on which the support is mounted so that it turns in an arc, the axis of which is substantially parallel to the axis of the corresponding roller, resilient means for causing the said scraper to engage the said roller, and means for mounting said support to enable the said scraper to turn automatically about an axis always located in a plane passing through the center of the working surface of the roller and substantially perpendicular to the axis thereof.

16. In a machine for sheeting plastic materials, the combination of a pair of superimposed aligned rollers for operating upon the material to be sheeted, a scraper for engagement with each of said rollers, a block fixed to the underside of each scraper, a pin to which each block is fixed, a transverse bar for supporting each of said blocks, an opening in each of said transverse bars for the reception of one of said pins, the axis of each of said openings passing vertically through the center of the operative edge of its respective scraper, a pair of second-class levers in which the ends of one of said transverse bars are fixed, a pair of first-class levers in which the ends of said second transverse bar is rigidly fixed, a shaft parallel to the axis of each of said rollers and upon which said levers are rotatably mounted, resilient means connecting the levers of said second-class with the said first-class levers in such a manner as to move the said scrapers against their respective rollers and means for keeping each of said pairs of levers on their respective shaft in such a position that the axis of each of said pins is always located in a cross sectional plane passing through the center of the working surface of and vertically with relation to the axis of its respective roller.

17. In a machine for sheeting plastic substances in combination, a roller, a scraper for engaging the periphery of said roller, means for supporting said scraper to move toward and from the axis of the roller and to turn at an angle to the axis of said roller, and elastic means to retain the said scraper in contact with said roller.

18. In a machine for sheeting plastic substances in combination, a roller, a scraper for engaging the periphery of said roller with its sharp edge, a support for said scraper in which the latter is pivotally mounted so as to turn on an axis lying in a plane substantially perpendicular to the sharp edge of said scraper, and means acting on said support for holding said scraper in contact with said roller.

LAURENCE SEYMOUR HARBER.